United States Patent Office 3,422,226 Patented Jan. 14, 1969

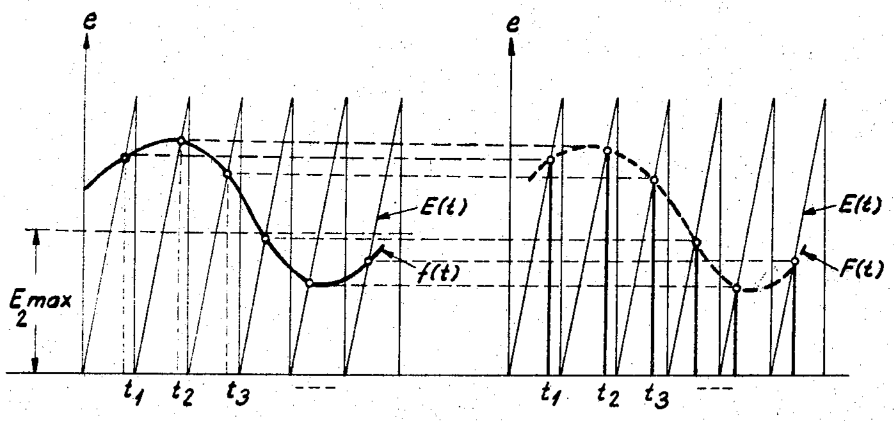
Fig. 2a₁
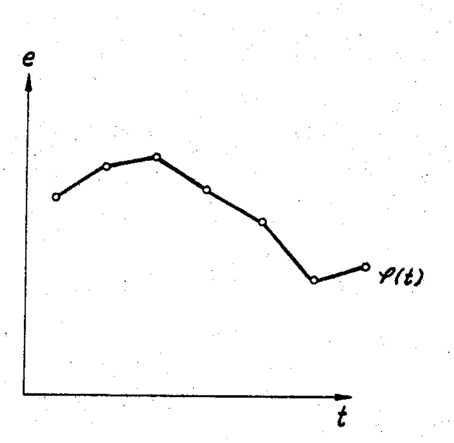
Fig. 2a₂

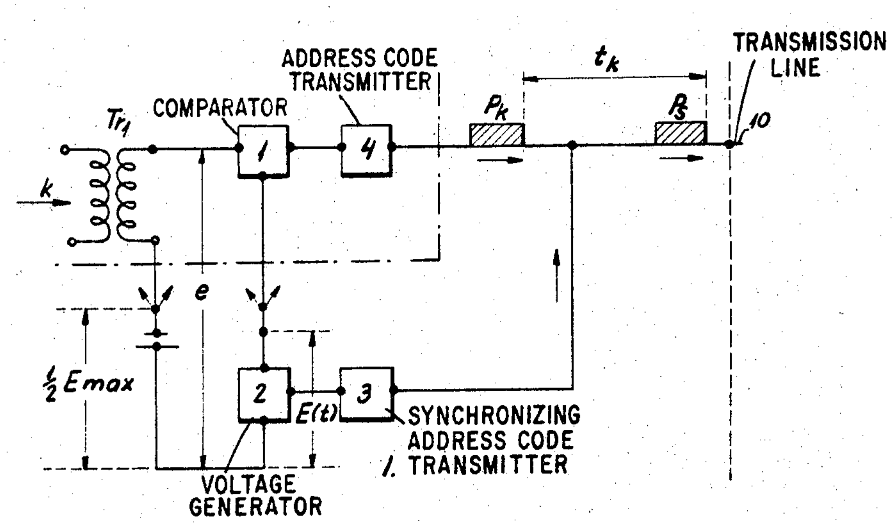
Fig. 2b1
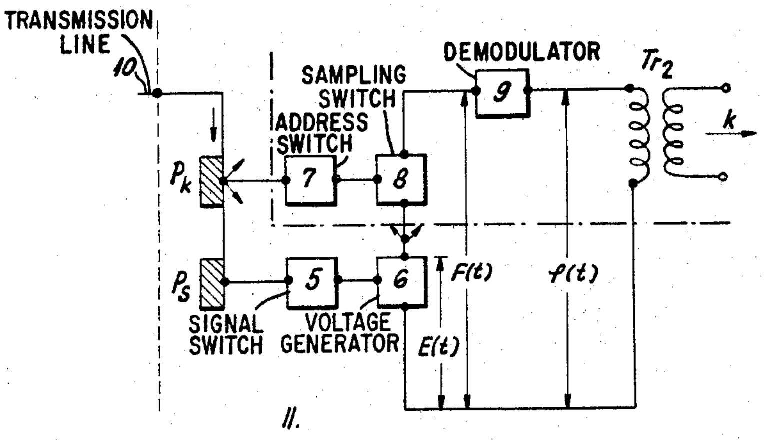
Fig. 2b2

3,422,226

METHOD OF, AND EQUIPMENT FOR TIME-DIVIDED, ASYNCHRONOUS, ADDRESS-CODED TRANSMISSION OF INFORMATION IN MULTI-CHANNEL SYSTEMS

Ernö Ács, Budapest, Hungary, assignor to Tavkozlesi Kutato Intezet, Budapest, Hungary Filed Mar. 11, 1965, Ser. No. 438,967
Claims priority, application Hungary, Mar. 11, 1964, TA–812
U.S. Cl. 179—15 3 Claims
Int. Cl. H04j *3/00;* H04j *3/06;* H03b *19/00*

ABSTRACT OF THE DISCLOSURE

Method and apparatus for transmission of multi-channels of information where the address of the place of destination is represented by the value of an address code and the amplitude value of the input signal is defined by the time position of said address code within the sampling period. The appropriate address code is transmitted through the line when the instantaneous value of each input signal and a first comparing voltage are equal. At the moment said address code is received at the respective output channel, the instantaneous value of a second comparing voltage is conducted to the respective demodulator. The two comparing voltages have identical, synchronous, monotonously increasing or decreasing functions with a period equal to the sampling peroid.

Figure 1:
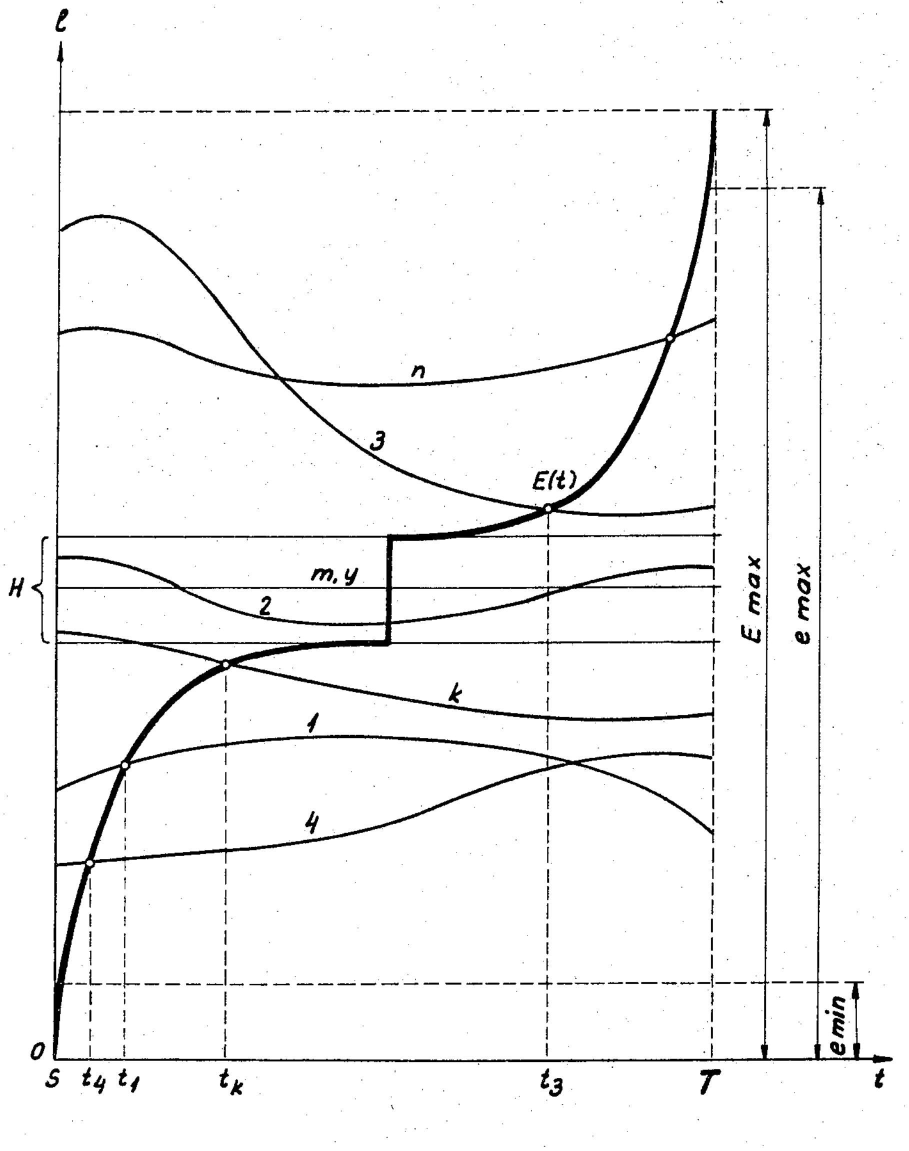

The subject-matter of the present invention is a method of time-divided, asynchronous, address-coded transmission of and information, further an equipment embodying the method according to the invention.

The fundamental difficulty lying in time-divided systems of information transmission hitherto known was that, with the increase of the number of channels, the problems of synchronization tended to become increasingly difficult to solve. A further drawback manifesting itself in pulse-position modulated time-divided systems was that with the increase of the number of channels the time interval available for pulse-position modulation tended to narrow down.

The method according to the invention overcomes both difficulties in a way that, firstly, it eliminates the problem of synchronization by introducing the address-code method, secondly although the invention uses pulse-position modulated transmission, in the event of a sufficiently large number of channels the time interval available for modulation will not contract, thirdly, the method according to the invention will exploit the full repetition interval for pulse-position modulation for the benefit of each channel, unlike the conventional pulse-position modulated methods, where for *n* channel only the *n*th part of the interval of the scanning period is available for each channel. Obviously for a system operating with, for example 8000 samplings per second, the circumstance that, of the 125 microseconds for each sampling period only an *n*th part will be available for each channel, or that, the full interval may be exploited for each transmission channel, if of great significance.

The known address-code system of information transmission which provides the connection between transmitter and receiver by using an address code avoids the difficulties of synchronism. However, as compared to simple PCM, transmission difficulties will arise in the known address-code system owing to the growth of the bandwidth of the transmission channels, this growth being proportional to the logarithm of the number of lines bundled in a time frame (channel) to base 2.

In the known PCM system of transmission the switches on both the sending and the receiving sides operate in synchronism, and in the channel interconnecting the switches the codes of the amplitude samples are passed. Thus, for PCM transmission it is synchronism that guarantees the identity of addresses of the inputs and outputs by pairs, whereas the transmission of the amplitudes is take care of by the interconnecting channel. As has already been mentioned, in this system safeguarding synchronism may amount to a serious obstacle to the increase of the number of channels.

The method according to the invention eliminates the difficulties discussed in the foregoing, and on principle provides a transmission of even better quality than that of PCM transmission wihtout, however, transmitting the sample taken from the amplitude of the information in either a coded or uncoded form over the channel. Since actual speech is based on specific statistics, the time-divided asynchronous method of transmission according to the invention could be given the designation of statistical address-coded trasnmission, and consequently in the following discussion the notation S*t*AC will be introduced for the method according to the invention.

In the S*t*AC system of transmission according to the invention advantages can be achieved by transposing the terms address and amplitude in a way that identity of amplitude is ensured for the inputs and outputs by pairs, whereas the transmission of the address is taken care of by the interconnecting channel.

To illustrate what has been set forth above it appears to be proper to draw a parallel between the S*t*AC system according to the invention and the PCM system of transmission. In a PCM connection, a latent value represents the address of the numeric value of the output associated with each amplitude code. This latent value is the time interval elapsed between the beginning of the sampling period and the completion of sampling. This means that in a transmission system of *n* channels a time $$t_k = \frac{k}{n} \cdot T$$

is associated with the sample received on input *k* of the system where T is the time of the sampling period, e.g. 125 microseconds. If at the beginning of each sampling period the transmitter sent out a synchronizing signal, $t_k$ would also represent the time lapse after which the code of the amplitude sample of the order *k* followed the synchronizing signal. If the line switch of the output (receiver) started in response to the synchronizing signal, and by connecting the lines in succession arrived at the line *k* exactly after an interval of $t_k$ then the sample would arrive at the specified output.

The key concept of the S*t*AC system of transmission according to the invention is that the codes transmitted in succession determine the address of the outputs, and not the numeric value of the amplitudes, while the latent values assigned to the codes will determine the information to be transmitted. Thus even in this case a time $t_k$ will be associated with the code advancing from input $k$ to output $k$, and in the sense of the invention this time will now determine an amplitude to be advanced to output $k$.

From what has been set forth it follows that according to the invention the method of "sampling" is different from that normally used in PCM transmission. As a matter of fact here the sequence of the scanned inputs will be different from that normally used in time-divided transmission, i.e. 1, 2, 3 . . . $k$ . . . $n$. In point of fact the sequence will be determined by the voltage values $e_p < e_2 < e_k < e_n < e_y$ etc., actually present on the inputs in question. Thus, in the present example the sequence will become $p$, 2 . . . $k$ . . . $n$ . . . $y$. According to the invention an input $k$ will start a code, to wit, an address, in the direction of the output when the voltage of the voltage function E($t$) produced by a local generator is equal to, or more exactly, surpasses, the voltage $e_k$ of the speed current on the input, i.e. $E_t = e_k$. The voltage function E($t$) is the periodic function of time, and its frequency conforms to the comparing (sampling) frequency, consequently $E(t)=0$ if $t$ is zero, and $$E(t)=E_{\max}, \text{ if } t \doteq T$$

The voltage $E_{\max}$ is somewhat higher than the maximum permissible load applicable to the inputs, i.e.

$$E(T)=E_{\max} > e_{\max}$$

In FIG. 1, the abscissa of the system of coordinates is the time axis and its ordinate is the voltage axis. The figure shows the potential states of the loaded inputs 1, 3, 4, $k$, $n$ during the time interval $0-T$, whereas the inputs 2, $m$, $y$ are unloaded. At the moment $t=0$ a synchronizing signal sets out, whereas at the moments $t_4$, $t_1$, $t_k$, $t_3$ address codes start from the inputs. In the figure the band in which there is no address emission is labelled H. This band is unloaded, i.e. it is the band of the non-conversing, silent lines. Empirically the function E($t$) should be built up in a way that the address transmission takes place, possibly uniformly, during the period $0-T$. Obviously this will be feasible based on a knowledge of the statistical distribution of the larger and smaller amplitudes.

Consequently there is essentially no sampling in the method according to the invention, but only a comparison of the potetials, by comparing the potentials of the input under test and that of the local generator. The only result of this comparison is an address-code starting command, however, without amplitude sampling or amplitude sample transmission.

It is of the essence of the transmission system according to the invention that, referenced to the synchronizing pulse which issues at the beginning of each scanning period, the address code of the channel is sent out at the moment when the potential value on the input of the channel in question exactly equals the value of a potential function produced by the voltage generator.

On the output side the function E($t$) is reproduced in a manner synchronized from the input, the output switches controlled by the address codes connect the local generator to the lines at the appropriate moments, and the input information is transferred to the outputs. As a matter of course the transferred information is not continuous, but consists of discrete voltage values. When the errors in comparing and of synchronism, which on principle may be made zero, and for practical purposes are negligible, are ignored, these discrete values will accurately conform to the input potential values, i.e. to the momentary amplitude values of the input information.

Thus in the method of transmission according to the invention, if on the input side function $f$(T) denotes the information to be transmitted, function F($t$) deotes the discrete potential values arriving at the output demodulator, and the frequency of comparison is $\nu_0$ (e.g. 8000/sec.), then in each second the value of two functions will be in agreement $\nu_0$ times. The values between the discrete values so obtained are formed by the demodulator by interpolation using one of the usual methods.

If $\varphi(t)$ denotes the demodulated signal function, then it should be borne in mind that nothing has been stipulated on the input side as to the bandwidth of the information to be transmitted, i.e. there is no high-pass filter. Function F($t$) returns the discrete values with accuracy. Band contraction and distortion may manifest themselves only in function $\varphi(t)$, partly dependent on the value of the comparator frequency, partly on the design of the demodulator. The signal transferred to the receiver input, i.e. function F($t$), is pulse-amplitude modulated, however, the particular pulses do not follow one upon the other at regular intervals, but at moments determined by comparisons, and consequently these moments will slightly depart from the regular course. In addition, because at least on principle comparison takes place with zero fault, the transferred pulses are not quantized quantities, so that there is no quantizing distortion. On the other hand it is not pulses that are transformed, but address codes, so that the transferred pulse cannot pick up noise on the transmission path. Synchronization, too, takes place by transmitting an address code starting the voltage generators producing the function E($t$) on both the sending and the receiving sides. Consequently, at starting the generators the instability will last only a fraction of the time of a single code. Thus, in a system of one hundred channels, where during a time T one hundred codes will be transmitted, distortion owing to instability will be well below the one hundredth part of the highest output. In systems of more than one hundred channels, e.g. of one thousand channels, the situation will be even better by an order of magnitude.

As may be inferred from what has been set forth above the StAC system of transmission according to the invention is in reality a special pulse position modulated system. As a matter of fact according to the invention, within the time interval $0-T$ the position of the address code will depend on the potential amplitude available at the input at the moment of the emission of the code.

As compared to other known systems the essential difference lies in that whereas in the earlier systems, at the transmission of $n$ channels a time $T/n$ will be available for pulse position modulation, in the system according to the invention the full time T will be available. Since the demodulator sets the amplitude exactly by sensing during this time, it is clear that the known pulse position modulated transmission systems will require time metering of an accuracy $n$ times that of the StAC system according to the invention in order to set an amplitude of the same accuracy.

Another essential advantage of the transmission system according to the invention as compared to other known time-divided systems is that some sort of a pulse modulator needed in the earlier systems may be discarded from the transmitter according to the invention. Even the analogue-digital converter which is responsible for major difficulties in the PCM method may be abandoned.

The subject-matter of the invention and the principle of transmission will be surveyed once again using as an example with the block schematic of an embodiment of the invention of FIGS. 2$a$ (2$a_1$ and 2$a_2$) and 2$b$ (2$b_1$ and 2$b_2$).

In FIG. 2$a$ the processes of comparing, transmitting, and demodulating are represented, while in FIG. 2$b$ the block schematic of a layout by way of example is shown.

As will be noticed in FIG. 2$a$ the continuous function $f(t)$ of the information to be transmitted goes over into function F($t$) including the values of comparison, and this function in turn goes over into the demodulated function $\varphi(t)$ in the demodulator. For the sake of simplicity the voltage function $E(t)$ provided by the local generator has been represented as a sawtooth oscillation. However, periodic functions of a different pattern might also be used. FIG. 2*b* shows the block schematic of channel *k* of the multi-channel transmission system, and of the common circuits. The hot spot of the secondary winding of transformer $Tr_1$ in channel *k* is connected to comparator 1, together with the voltage generator 2 which produces the voltage function $E(t)$. At the outset of each period of comparison voltage generator 2 actuates the synchronous address code transmitter 3, which advances the synchronizing code $P_s$ (address code) over the transmission line 10.

When $E(t)$ equals $f(t)$, i.e. at moments $t_1$, $t_2$, $t_3$, etc., comparator 1 operates the address code transmitter 4, which transmits a code conforming to the numeric value *k* in like way over transmission line 10. The time elapsing between the emission of the codes $P_s$ and $P_k$ has been designated $t_k$. The code $P_s$ arriving at the output operates the signal switch 5 common for all channels of the receiver, which then starts voltage generator 6, which also produces the voltage function $E(t)$.

The code $P_k$ operates the address switch 7, which in turn starts the sampling switch 8, which connects the generator 6 to the input of the demodulator 9. At the input of the demodulator, function $F(t)$ appears with discrete amplitude values at the moments $t_1$, $t_2$, $t_3$, etc., whereas after the demodulator it will appear with the signal function $\varphi(t)$, which in the present example is a result of the linear interpolation of the function $F(t)$.

It is possible that, owing to the importance of the information to be transmitted even for a signal-to-noise ratio of a few decibels inferior to the critical 17 decibels, all transmissions not of tolerably good quality should be rejected at the receiver. It is also possible that an address code spoiled by noise will transmit the information to the wrong address, i.e. passes on an error signal. It should be noted that for practical purposes, there is an extremely small probability, of an order of $10^{-10}$ $10^{-12}$, that this will occur.

In accordance with the invention the probability of error may be reduced by several orders of magnitude when the address code is built up of more bits than absolutely necessary.

To illustrate what has been set forth above, consider by way of an example an S*t*AC transmission systems of *n* channels in which increased safety has been made a major consideration. The number *p* of the bit positions required may be determined from the equation $2^p=n+1$. The number *i* of actual bits, depends on the concrete numeric value *s*, where $1\leqq s\leqq n$ and $1\leqq i\leqq p$.

The excess, or redundant portion of the code should be formed, for example, of a bit position *h*, which stands in a relation $2^h=p+1$ to *p*, and indirectly to *n*.

Thus, the redundant code $r_s$ of the numeric value *s* should be expressed by the equation $r_s=p_s+h_i$, where $p_s$ is the binary code of the numeric value *s*, and $h_i$ the binary code of numeric code *i*. In this case each address will be determined by two numeric data, viz. *s* and *i*. When it is assumed that due to the effect of noise a new pulse arises, or an existing one disappears, it is clear that the resulting code will fail to conform to the address of any one of the outputs. In fact when a pulse disappears or arises in section *p*, then the number of changed bits in section *p* will not conform to the unchanged binary code in portion *h*. And when a bit arises or disappears in section *h*, then the changed binary numeric value in section *h* will not conform to the unchanged number of bits in section *p*. A false binary code occuring in the set of addresses can arise only on the simultaneous disappearance of genesis of two or more pulses, e.g. although a bit disappears in section *p*, at the same time another arises there. This fact produces a high degree of protection against noises.

By a calculus of probabilities it may be shown that the probability of the genesis of a false code is a single faulty code per hour for a signal-to-noise ratio of 17.4 decibels, while the probability is a single faulty code per year for a signal-to-noise ratio of 19.5 decibels. Each such false code would manifest itself in the form of a click in the transmission hourly or annually, as the case may be.

What I claim is:

1. Method for time-divided, pulse-modulated, address-coded transmission of information in a telecommunication equipment having a plurality of input and output channels connected by a transmission line which comprises generating a first comparing voltage having a monotonously increasing or decreasing function and a period equal to the sampling period; generating a second comparing voltage having a function identical to the function of said first comparing voltage; synchronizing said first and second comparing voltages in each sampling period by means of a coded group of pulses transmitted along said transmission line; continuously comparing each input signal with the first comparing voltage; transmitting address codes along the transmission line, each address code being transmitted at the moment that the instantaneous values of said first comparing voltage and an input signal are equal, each said address code being characteristic of the selected output channel; detecting each of said address codes at the output channel for which the address code is characteristic; sampling the instantaneous value of said second comparing voltage at each output channel at the moment that an associated address code is detected; and demodulating the samples at each output channel whereby an output signal corresponding to the input signal is reconstructed from said samples.

2. A method as recited in claim 1 wherein the address code transmitted at the moment that the instantaneous values of said first comparing voltage and an input signal are equal includes redundant bits in addition to those necessary to characterize the output channel.

3. Equipment for time-divided, position-modulated, address-coded transmission from a plurality of input channels along a transmission line to a plurality of output channels comprising a first comparing voltage generator common for all input channels adopted to generate a voltage having a periodic, monotonously increasing or decreasing function and a period equal to the sampling period; a synchronzing address code transmitter common to all input channels, said synchronizing address code transmitter being connected to said first comparing voltage generator and, at its output, to the transmission line, and being adapted to generate a synchronizing code in each sampling period; a signal switch common to all output channels, said signal switch being connected to the transmission line and adapted to operate when a synchronizing code is received therefrom; a second comparing voltage generator common to all output channels, said second voltage generator being adapted to generate a function identical to the function generated by said first voltage generator and connected to said signal switch whereby said second voltage generator is synchronized with said first voltage generator; a plurality of comparators, each of said input channels being connected to a comparator as a first input, said first comparing voltage generator being connected as a second input to all of said comparators; a plurality of address code transmitters, each being connected to the output of one of the comparators and at its output, to the input of the transmission line; a plurality of address switches, one for each input channel, said address switches being connected to the output of the transmission line and adapted to operate when an address code characteristic of its related output channel is received from said transmission line; a plurality of sampling switches, each of said address switches being connected to the control input of a sampling switch; and a plurality of demodulators, each of said output channels being connected to the output of a demodulator, and each of said sampling switches being connected between said second comparing voltage generator and the related demodulator, whereby a sample of the function generated by said second comparing voltage generator is applied to the input of the demodulator at the moment said sample switch is operated by the associated address switch.

References Cited

UNITED STATES PATENTS

| | | | |
|---|---|---|---|
| 3,340,366 | 9/1967 | Bour | 179—15 |
| 3,158,691 | 11/1964 | Brightman | 179—15 |

RALPH D. BLAKESLEE, *Primary Examiner.*

U.S. Cl. X.R.

328—15; 340—172